Oct. 14, 1958  J. J. RILEY ET AL  2,856,546
ELECTRONIC COMMUTATOR FOR WELDING MACHINES OR THE LIKE
Filed Sept. 10, 1956  4 Sheets-Sheet 1

FIG. 1A

INVENTORS
JOSEPH J. RILEY
EMMANUEL V. DETHIER
BY Francis J. Klempay
ATTORNEY

Oct. 14, 1958        J. J. RILEY ET AL        2,856,546
ELECTRONIC COMMUTATOR FOR WELDING MACHINES OR THE LIKE
Filed Sept. 10, 1956        4 Sheets-Sheet 4

Fig. 2B

INVENTORS
JOSEPH J. RILEY
EMMANUEL Y. DETHIER
BY Francis J. Klempay
ATTORNEY

_United States Patent Office_

2,856,546
Patented Oct. 14, 1958

2,856,546

ELECTRONIC COMMUTATOR FOR WELDING MACHINES OR THE LIKE

Joseph J. Riley and Emmanuel V. Dethier, Warren, Ohio, assignors to The Taylor-Winfield Corporation, Warren, Ohio, a corporation of Ohio Application September 10, 1956, Serial No. 609,008

18 Claims. (Cl. 307—112)

The present invention relates to an electronic commutator or interlocking device for regulating and controlling the flow of welding current and power to a battery of welders or other like mechanisms. It is the characteristic of normal electric resistance welding operations, such as spot welding, for example, that very high welding current is supplied to the welding electrodes and the workpiece during a relatively short period of time when compared with an overall operating cycle of the individual welder. The "on" time in which current is required is usually of much shorter duration than the time necessary to properly position the workpiece, move the electrodes into pressure contact therewith, and to complete the various other mechanical functions associated with a welding cycle. Thus, such machines require short intervals of extremely high current from the supply source.

When a battery of welders is used in a shop or factory on a large scale production basis it is desirable to provide some means for controlling and regulating the flow of welding current and power to the welders in such a manner that only one welder will be drawing current at any one time in order that the instantaneous power flow from the source is reduced to a minimum. Such an arrangement is almost mandatory because, if not provided, the power source must be designed to handle the possible condition of all of the individual welders conducting at the same instant. Obviously, this requires an extensive supply circuit and transformer therefore having a kva. capacity equal to the combined kva. capacity of all of the spot welders while if some commutating arrangement is afforded the kva. capacity of the supply circuit need only be of sufficient size to supply the welder having the highest kva. demand. In addition, any transient effects due to the interconnection of two or more welders to the supply source at the same time and the associated problems of extra instantaneous loading are avoided.

The interlocking of two welding machines for their complete cycle of operation to obtain the above described advantages is quite common and there have been many systems heretofore proposed in the prior art for carrying out this interlocking. In such an arrangement there is usually very little if any loss of production if the complete sequence of one machine is blocked while the other is performing a welding operation. However, when such a system is extended to three or more welding machines it is a practical necessity that the welding machines be interlocked during the "weld time" only—i. e. only the time that the weld current is flowing—if the production from each machine is to remain at the same relative rate as the rate of a single machine operating from its own source without interlocking. Even if a commutating or regulating system is employed on a battery of six or more machines during the "weld time" only a loss in production may result but such a loss may be more than compensated for by the savings afforded in the supply system as hereinbefore explained.

Several systems have been proposed for interlocking the welding machines and commutating power thereto only during the "weld time" interval but such systems are not adapted for use in connection with present day welding systems and are characterized by their many moving mechanical parts which are subject to frequent and periodic breakdown. As will be appreciated by those skilled in this particular art, welding machines are now controlled by various sequencing circuits utilizing electronic components to regulate and control the various mechanical and electrical functions of the welding machine in an accurate and precise manner. Prior art commutating devices of the type contemplated are not adapted to be integrated with such electronic sequencing circuits now in wide spread use throughout the industry as such mechanisms usually employ complicated camming mechanisms and are often limited to the number of machines which can be controlled thereby.

In addition, these prior art devices are not "positive" in their operation of allowing only one welding machine to pass current at any one time as there is still a possibility that two machines will conduct simultaneously. Further, if the length of weld time of one machine is changed the commutating or interlocking device must be re-calibrated and arranged to meet the new set of conditions.

It is therefore the primary object of the present invention to provide a new and novel commutating device for a battery of electric resistance welding machines wherein the machines are interlocked during the "weld time" period only in order to allow the utilization of a minimum size supply source and appurtenant equipage but yet allow substantially maximum production from the welders. As will be more readily apparent, the apparatus of the present invention has the function of knowing a machine has started welding and thereby lock out the other machines during the "weld time" only as well as determine an order of operation should several machines desire to pass welding current simultaneously. If the latter be the case, it selects one machine and allows it to complete its operational cycle and sets up an order for the remaining machines desiring to pass current.

It is yet another object of the invention to provide a commutating device for a plurality of welding machines which is well adapted to be integrated with the electronic controlling and sequencing circuits now widely employed to regulate and control the operations of welding machines. The commutator of the present invention enters each of the controls of the individual welders in the anode-cathode circuit of the discharge device and relay which must be energized to start the flow of welding current and is operative to effectively either prohibit or allow the same to initiate the flow of welding current.

A further object of the present invention is to provide apparatus of the character described which is electronic in nature whereby rotating cams and other like devices are eliminated as well as the maintenance and other difficulties associated therewith.

A more specific object of the invention is to provide a novel electronic gate circuit in combination with various relays which insures a consecutive operational order of the welding controls while preventing the simultaneous occurrence of the weld time sequence on the interlocked controls.

Another object of the present invention is to provide new and novel electronic circuitry embodying a minimum number of component parts for accomplishing the above stated objects.

These, as well as other objects and advantages of the invention will become more readily apparent upon further consideration of the following specification and accompanying drawing wherein there is described and shown a representative embodiment of the invention.

In the drawing:

Figure 1, composed of two parts, Figure 2, comprising

Figure 1A:
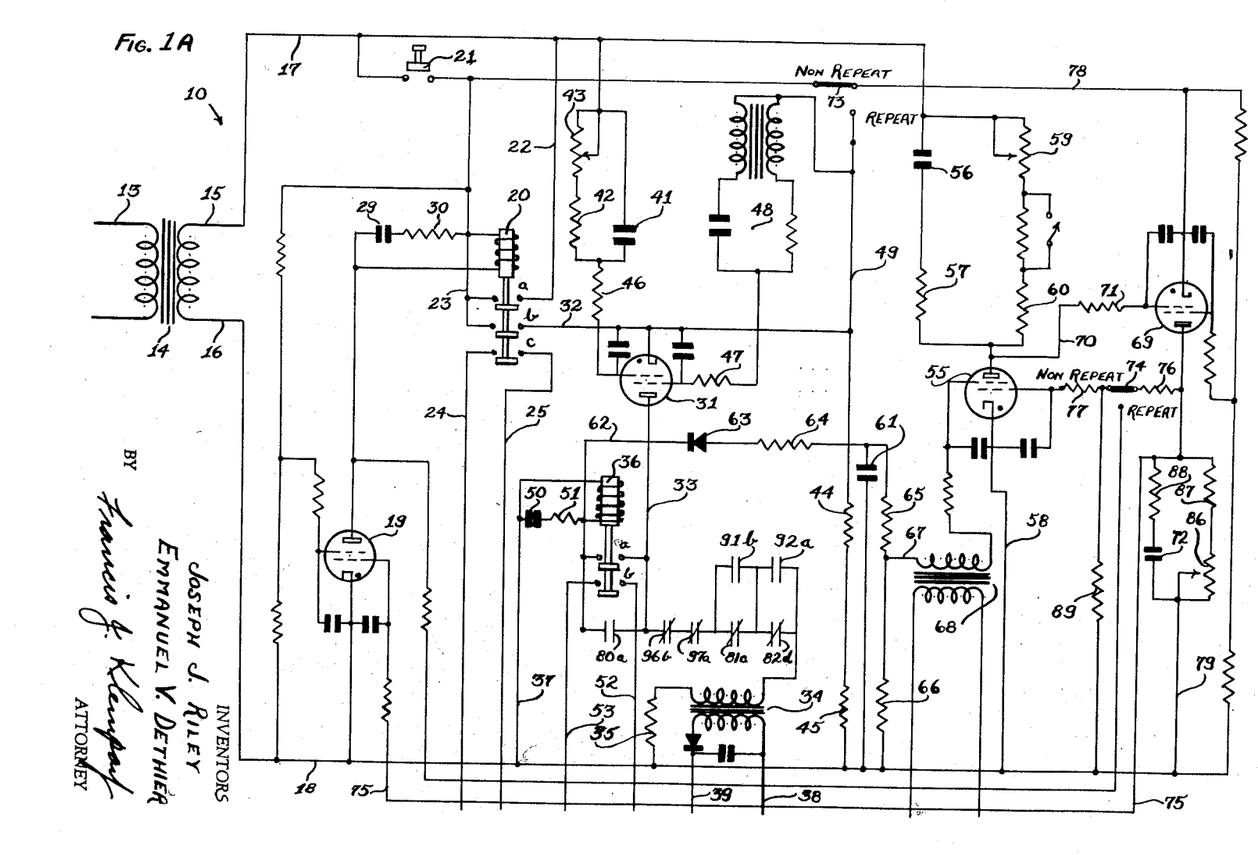
Figures 1A and 1B, is a schematic arrangement of a typical resistance welder sequencing circuit employing the commutating device of the present invention.
Figures 1B, 2C:
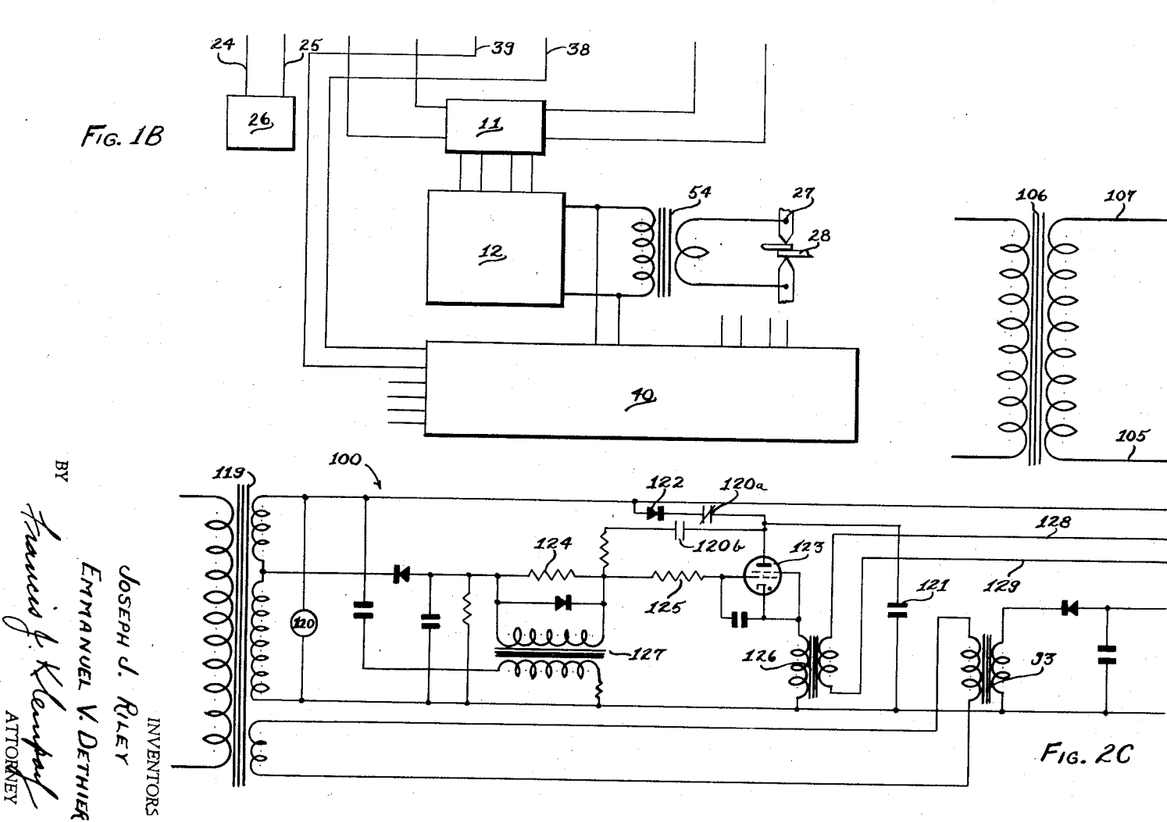
Figures 2A, 2B and 2C, is a schematic circuit arrangement of the new and novel commutating device constructed in accordance with the teachings of the present invention shown utilized in connection with a battery of welding machines.

For a complete understanding of the present invention it is first necessary to acquire an understanding of the type of electronic sequence control now widely utilized to control and regulate the welding operation of an individual welding machine. Although such circuits may vary considerably in their individual construction, component parts and specific operation, they generally all accomplish the same result—that is to time and sequence the various functions of the welding machine. To illustrate the present invention, but in no way intended to limit the same, there is shown in Figures 1A and 1B a representative embodiment of such a sequencing circuit. This is shown to include three sections—namely, a sequencing section 10, to be hereinafter more fully explained, a synchronous timer section 11 and a contactor 12.

The reference numeral 13 designates a commercial alternating power source, to which is connected the primary of a transformer 14. The secondary of the transformer 14 is provided with terminals 15 and 16 connecting, respectively, to conductors 17 and 18. Connected across these two conductors are, in series relation, a gaseous discharge device 19, relay 20 and a starting switch 21, the latter preferably being of the type which is controllable by the foot of the machine operator. As will be observed, closure of the switch 21 will energize discharge device 19 and cause relay 20 to be actuated. Contacts 20a, in cooperation with the conductors 22 and 23, form a holding circuit in parallel with the switch 21 whereby the latter may be but momentarily closed to initiate a cycle of welding operation. Contacts 20c of relay 20 connect conductors 24 and 25 which lead to a mechanical control panel 26, and in the illustrated application of the control circuit it is contemplated that the closure of contacts 20c will cause movement of welding electrodes 27 toward and into pressure contact with workpieces 28. In accordance with usual practice capacitor 29 and resistor 30 are provided in shunt relation to relay 20 so that energy may be stored during the conducting half-cycles of discharge device 19 and discharged through the alternate non-conducting half-cycles whereby the relay 20 will be maintained in an energized condition.

Closure of relay contacts 20b effectively connects the cathode of a second gaseous discharge device 31 to the conductor 17 via conductor 32. The anode-cathode circuit of the discharge device 31 may be alternately completed through either of a pair of parallel paths now to be described. The first path may be traced from the anode of the discharge device 31 through conductor 33 and the four series connected relay contacts, 96b, 97a, 81c and 82d, the latter two of these contacts being provided with the relay contacts 91b and 92a in shunt relation therewith, then through the primary of transformer 34 and resistor 35 to the conductor 18. The second path comprises the conductor 33, normally open relay contacts 80a, relay 36 and conductor 37 leading to the conductor 18. The various relay contacts included in these alternate anode-cathode circuits of the discharge device 31 comprise a portion of the new and novel commutating or interlocking circuit of the present invention. The secondary of the transformer 34 is connected by way of conductors 38 and 39 to a commutator or interlocking device 40 to be hereinafter more fully described. For the present it is assumed that the various relay contacts in the anode-cathode circuits of discharge device 31 are either open or closed as shown in the drawing. Accordingly, the discharge device 31 will then fire through the first mentioned path described above upon proper conditioning of its control and screen grids as will be apparent.

In the resistance welding art it is desirable to provide a certain time interval or "squeeze time" between the moving of the electrodes 27 into pressure contact with the workpieces 28 and the subsequent application of welding energy thereto. It is preferable to condition the control grid of discharge device 31 with a normally negative hold-off signal whereby the same will be maintained in a non-conductive state for a predetermined time after the closing of relay contacts 20b. This may be accomplished by providing a time constant circuit comprising capacitor 41, resistor 42 and adjustable potentiometer 43 in the grid circuit of the discharge device 31 and connected to the conductor 17. To charge the capacitor 41 there are provided resistors 44 and 45 connected between the cathode of the discharge device 31 and the conductor 18 and resistor 46 interposed between the "squeeze time" circuit and the control grid of this discharge device, the arrangement being such that the capacitor 41 is charged by grid rectification prior to the initiation of the relay 20. The charge assumed by the capacitor 41 provides a highly negative control grid signal for discharge device 31 and the latter will therefore remain non-conductive upon the closure of contacts 20b until the charge has been sufficiently dissipated through resistor 42 and potentiometer 43. Obviously, the "squeeze time" may be varied by changing the setting of the potentiometer 43 to vary the time constant of the network.

For further control of the discharge device 31 the screen grid thereof is connected through resistor 47 and a network 48 to conductor 49 for providing a lagging phase shifted voltage to insure full conduction of the discharge device 31 thereby avoiding any chattering of the relays associated therewith.

If the various relay contacts 96b, 97a, 81c and 82d are in the state shown, a signal will be generated in the transformer 34 upon the initial conduction of discharge device 31 and relayed to the commutator 40. If the commutator is satisfied that no other welding machine is passing current at this time the relay contacts 80a will be closed thereby allowing the actuation and energization of the relay 36. This specific operation and effect of the commutator 40 will be discussed in greater detail later in the specification. The relay contacts 36a are provided to lock in the anode-cathode circuit of the discharge device 31 irrespective of the condition of the various relay contacts and thereby insure continued and uninterrupted conduction of this device once the contacts 80a have been momentarily colsed. As is usual practice a capacitor 50 and resistor 51 are provided in parallel with the relay 36 to prevent chattering theerof.

Closure of relay contacts 36b completes a circuit through conductors 52 and 53 to the synchronous timer section 11 of the welding control and energizes the same to start the "weld time" by proper conditioning of the contactor section 12. In actuality the contactor may be an electronic switch comprised of inversely connected mercury arc-type primary discharge valves to control the flow of current to welding transformer 54. As will be apparent to those skilled in this particular art, the synchronous timer section may control the contactor in such a manner as to afford "heat control" over the current flowing in the workpiece. In any event, the construction of the circuits utilized in these sections is well known and does not form a part of the present invention. It will be noted, however, that the start of the flow of welding current to the workpieces is dependent upon the closure of the relay contacts 80a and the firing of discharge device 31.

After completion of the weld it is customary to hold the electrodes 27 in pressure contact with the workpieces 28 for a certain "hold time" wherein the workpieces become properly fused together. Thus in the sequencing circuit herein illustrated, there is provided means which are operative to retract the electrodes a predetermined time after the completion of the "weld time." This means includes a third discharge device 55, the anode of which connects the conductor 17 through "hold time" capacitor 56 and resistor 57 while the cathode thereof is joined directly to the conductor 18 by way of conductor 58. A potentiometer 59 and a resistor 60 are conected in parallel relation across the hold time capacitor 56 to define a timing network. Prior to the energization of the relay 20 the discharge device 55 is operative to conduct thereby charging the capacitor 56 to its initial value through the above described circuit.

When discharge device 31 conducts and the relay 36 has been energized capacitor 61 is charged through a circuit comprising conductor 62, rectifier 63 and resistor 64 to stop the conduction of the discharge device 55. This is accomplished by providing the resistors 65 and 66 in parallel with capacitor 61 and tapping a conductor 67 intermediate these last mentioned resistors which leads to the screen grid of the discharge device 55. Since it is undesirable that the "hold time" should start before the completion of the "weld time" a secondary of transformer 68 is interposed in the conductor and the primary terminals thereof has leads which are connected in the synchronous timer section 11 of the welder control; the arrangement being such that a positive signal is deliverd to the transformer 68 from the synchronous section 11 during "weld time" to allow the discharge device 55 to continue to conduct regardless of the charge on the capacitor 61. When, however, the "weld time" is completed this signal is stopped and the charge on the capacitor 61 gains control to stop conduction of the discharge device or valve 55.

When the discharge device 55 is extinguished at the end of the "weld time" the "hold time" starts with the discharge of capacitor 56 through the potentiometer 59 and resistor 60. The "hold time" network is also connected to the control grid of a discharge device 69 via conductor 70 and resistor 71 in the manner shown and it will be appreciated that when the capacitor 56 has discharged a sufficient amount to relieve the negative hold-off bias supplied thereby that the dischrage device 69 will begin to conduct. This conduction causes charging of capacitor 72 in the anode-cathode circuit of the discharge device 69 and when the switches 73 and 74 are in the position shown (for non-repeat operation) the voltage appearing across this capacitor is utilized to stop the conduction of discharge devices 55 and 19 even though the start or initiating switch 21 remains depressed. The latter is afforded by connecting the control grid of device 19 with the voltage appearing across the capacitor 72 by means of the conductor 75 and the latter through a circuit including resistors 76 and 77. Obviously, this causes the relays 20 and 36 to be deenergized thereby returning the same to their normal state. Conduction of discharge device 69 will continue until the start switch 21 is released, after which the capacitor 72 will discharge to allow immediate conduction of device 55 and the device 19 upon another actuation of the start switch 21.

In repeat operations—wherein automatic recycling of the apapratus is desired—the switches 73 and 74 are thrown to their alternate positions and the operations of the welder control will be repeated as long as the start switch is held closed. In this type of operation discharge device 69 will only conduct as long as discharge device 19 is conducting since the energizing circuit for the former is completed through the contacts 20b of relay 20, conductor 32 and conductor 78. When discharge device 19 stops conducting a positive signal will be placed on the control grid of the device 55 by way of conductor 79 and resistors 89 and 77 to insure that the same conducts to charge capacitor 57. Capacitor 72 will render the discharge device 19 non-conductive until the charge thereon is dissipated through potentiometer 86 and resistors 87 and 88. If the start switch is opened during the sequence of operation and remains open, the control will stop at the end of sequence.

Although the sequencing circuit shown in the drawing and described above is well adapted for use with the new and novel commutator of the present invention it is meant to be illustrative only to provide a basis for understanding the circuitry now to be described since many other such controls may be employed with the commutator and interlocking device. As is apparent, each welder in a battery of welding machines will be provided with a sequencing control as described above.

*Electronic commutator*

Figure 2A:
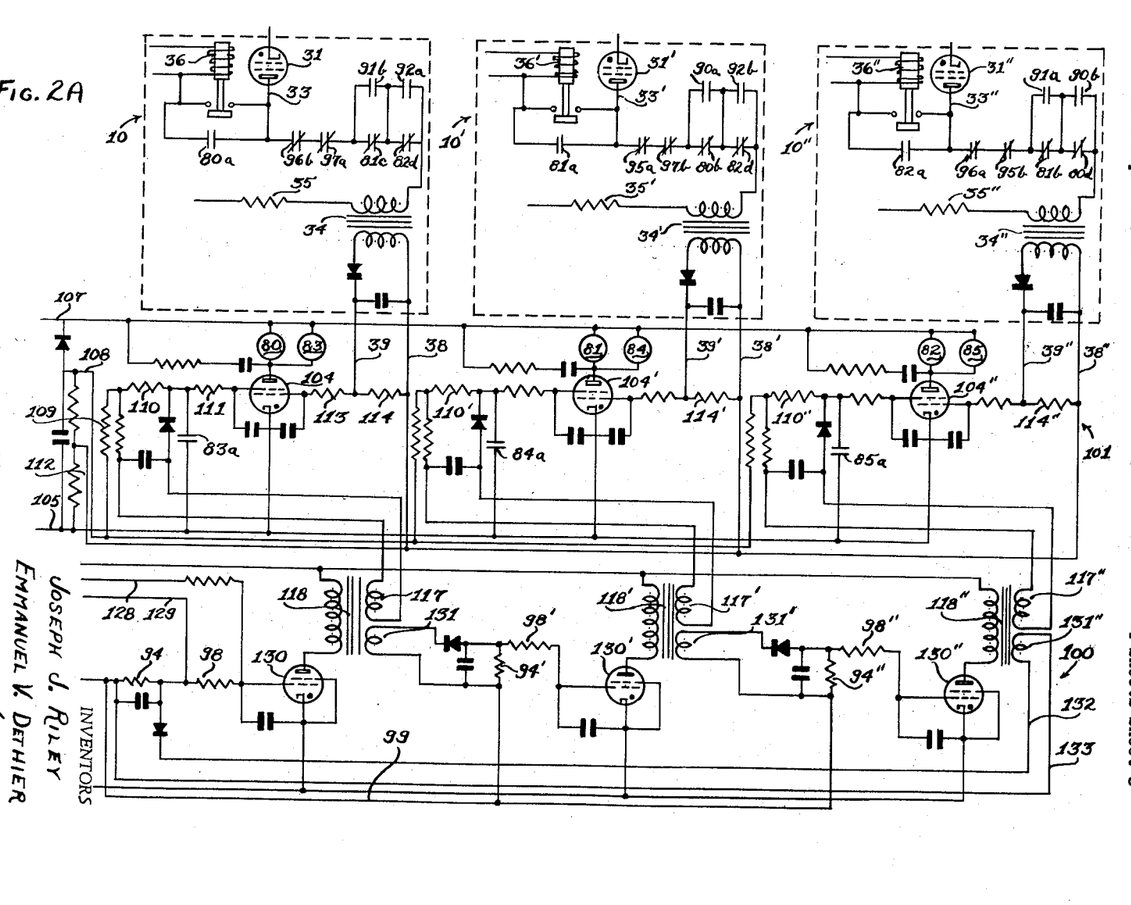
Figure 2B:
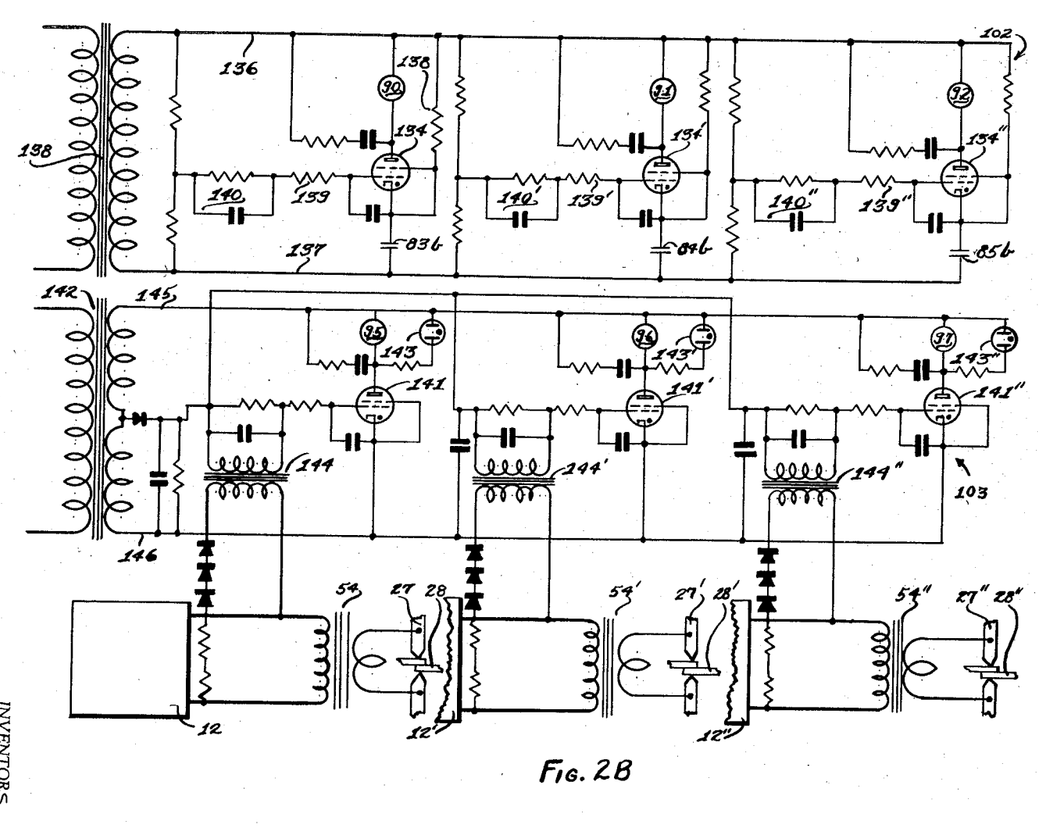

Referring now to Figure 2 of the drawing, which is perhaps best understood by arranging Figure 2b directly under Figure 2a and Figure 2c to the left thereof, there is shown a commutator constructed in accordance with the teachings of the present invention applied to a battery of three welders. To avoid unnecessary repetition in the description of the commutator and interlocking device, like component parts common to all of the welders will be designated by like reference numerals with the numeral associated with the second welder being primed and those with the third welder being double-primed.

In the case of all of the welder sequencing controls the area enclosed by the broken line represents the sequencing section 10 with only the relays 36, the discharge devices 31 and the connecting components being shown therein, the complete structure of the sequencing section having been described in connection with Figure 1. It is appropriate to note, however, that each of the sections 10—10" comprises different sets of relays for completing the anode-cathode circuits of the discharge devices and the energizing winding of the coils. In the sequence section 10 these relay contacts are 80a, 96b, 97a, 81c, 82d, 91b and 92a while in section 10' they are 81a, 95a, 97b, 80b, 82d, 90a, and 92b and in section 10" the contacts are numbered 82a, 96a, 95b, 81b, 80d, 90b and 91a. It will be apparent from further consideration of the specification that by properly controlling the actuation of these relay contacts that a positive and substantially fail-safe interlocking and commutating device is provided for the battery of welders. For each of the welders to be controlled there pertains one stage of a continuously revolving electronic gate circuit 100, one section of an intermediate relay network 101, one section of a time delay network 102 and one section of a weld signal relay network 103.

Each section of the intermediate relay network 101 comprises a discharge device 104 having its cathode connected to a conductor 105 leading from a supply transformer 106 and its anode operatively coupled with conductor 107 leading from the other side of the supply transformer through paralleled relays. For the network associated with the sequencing section 10 these relays include an intermediate relay 80 having its contacts 80a, 80b and 80d, arranged in the various welder controls as shown and an auxiliary relay 83 with the normally open contacts 83a and 83b in the interlocking relay network 101 and the time delay network 102, respectively. The relays associated with the second and third welder controls are designated by the 81 and 84 and 82 and 85 with the various contacts thereof carrying the relay number and an alphabetical subscript to facilitate later discussion of the system. Suitable capacitor and resistor networks are provided in parallel with these intermediate and auxiliary relays to prevent chattering thereof as is the practice in the art. It should be apparent that upon conduction of the discharge device 104 that the relays 80 and 83 will be energized but the device 104 is normally maintained in a quiescent state due to the negative hold-off biases present on both its screen and control grids. The screen grid bias is supplied by conductor 108 and the circuit can be traced through the resistors 109, 110 and 111 while the control grid bias is imposed through a circuit including conductor 112 and resistors 113 and 114. Connected across the resistor 114 by conductors 38 and 39 is the secondary of transformer 34 and a filtering network, the arrangement being such that when a current flows through the primary of transformer 34 a signal is superimposed on the normal control grid hold-off signal to condition this grid for the conduction of the device 104. The resistor 110 in the screen grid biasing circuit for this discharge device is in parallel with a secondary 117 of transformer 118 in the electronic gate circuit 100. The discharge device 104 will not conduct unless the control and screen grid signals are driven positive simultaneously by the voltages supplied from the transformers 34 and 118. It will be noted that relay contacts 83a are so arranged to effectively connect the screen grid of discharge device 104 to its cathode upon momentary actuation of the auxiliary relay 83. A similar arrangement is provided for each section of the intermediate relay network associated with the welder controls 10' and 10''.

Considering now the novel electronic gate circuit 100 of the present invention, the primary of a supply transformer 119 is connected to a commercially available supply of alternating current and when a power switch (not shown) controlling the energization of all of the supply transformers of the commutator of the present invention is closed a time delay relay 120 interposed across secondary terminals of the supply transformer 119 will be energized. During the timing period of this relay capacitor 121 will be charged through a circuit including the rectifier 122 and normally closed contacts 120a of the time delay relay. A discharge device 123 is initially held non-conductive by the large negative voltage placed between its control grid and cathode through a circuit including resistors 124 and 125, the primary of transformer 126 in the anode-cathode circuit of the device and a portion of the secondary of transformer 119. A peaked voltage is superimposed on the control grid by transformer 127 connected across resistor 124 but the hold-off voltage is of such magnitude that the discharge device is not allowed to conduct. After the time delay relay 120 has finished its timing the contacts 120a and 120b are opened and closed, respectively, so that the charge on capacitor 121 is effectively placed in the control grid circuit of the discharge device 123 and the hold-off bias is raised to a point whereby this discharge device will conduct upon the next application of peaked voltage from the transformer 127. This causes an inrush of current in the transformer 126 which is transferred via conductors 128 and 129 to the control grid circuit of discharge device 130 which is initially non-conductive by virtue of the potential appearing between the control grid and cathode thereof. The circuit for supplying the hold-off bias includes transformer 93 and resistors 94 and 98 as well as the conductor 99 for the discharge devices 130' and 130''.

The signal from transformer 126 triggers the device 130 and the same fires for one-half of a cycle thereby causing current to flow in the primary of transformer 118. It is noted that the device 130 will not conduct longer than one-half cycle since discharge device 123 will be extinguished as soon as the capacitor 121 discharges and the control grid signal has been reduced to its initial value. It is the characteristic of the discharge devices employed in the electronic gate circuit that upon initiation of conduction they will continue to conduct for a full half-cycle until the current begins to swing in the opposite polarity regardless of the control voltages impressed across their screen and control grids after they have once been initiated.

The conduction of discharge device 130 energizes secondary 131 of the transformer 118 and this sends a signal to charge a capacitor 150 connected thereacross. As previously intimated, the voltage appearing across the secondary 117 of this transformer is used to properly and partially condition discharge device 104 for conduction. After discharge device 130 stops conducting the capacitor 150, which is in the grid circuit of discharge device 130', will discharge so as to pull the control grid potential on this device sufficiently positive to allow the same to starting conducting. It is noted that this capacitor will be discharged within a half cycle in order that the device 130' conducts only for half a cycle of the supply voltage. When tube 130' fires it in turn prepares the discharge device 130'' for conduction. The secondary 131'' of transformer 118'' is connected in the control grid circuit of discharge device 130 via the conductors 132 and 133 so that this device will be triggered after conduction of device 130''. It should be apparent that the devices 130—130'' will conduct one after the other in a consecutive order thereby causing the electronic gate circuit to revolve continuously once the same has been started. It will be noted that the discharge device 104 can only be initiated when discharge device 130 is conducting and the same relationship pertains between the devices 104'—130' and 104''—130''.

In the first section of the time delay network 102 there is an electronic valve or discharge device 134 whose anode-cathode circuit includes a relay 90 and contacts 83b of the auxiliary relay 83. For the sequencing section 10' and 10'' corresponding components are utilized in conjunction with the discharge devices 134' and 134''. While the auxiliary relay contacts 83b are open a capacitor in RC circuit 140 is charged by grid rectification via a circuit which can be traced from conductor 136 through resistor 138 to the cathode, thence to the control grid, resistor 139, R. C. circuit 140 and conductor 137. When the auxiliary relay contacts 83b are closed grid rectification is stopped because of the change in polarity on the cathode of discharge device 134 but the same will not conduct until negative hold-off bias supplied by the capacitor in the RC circuit 140 is dissipated through its associated resistor. Thus, a time delay is provided between the time of closure of the contacts 83b and the energization of relay 90, dependent, of course, on the time constant of the RC network 140. Relays 90—92 are provided with paralleling circuits to prevent chattering thereof when energized.

The weld signal relay network 103 includes three identical sections, each of which comprises a discharge valve 141 and a weld signal relay connected in series across conductors 145 and 146 extending from the secondary winding of a supply transformer 142. In parallel with the weld signal relay is a resistor and a glow lamp 143 which may be mounted on an appropriate control panel and indicates that the weld signal relay is energized. The discharge device 141 has the control grid thereof biased in such a manner that this device is normally non-conductive. Connected in parallel relation with a resistor in the control grid biasing circuit is a secondary of transformer 144 which has its primary connected across the primary side of the welding transformer 54. When a current is flowing in the welding transformer 54 a positive voltage will be generated by the decaying flux in signal transformer 144 to drive the control grid of the discharge device 141 sufficiently positive to allow this device to conduct.

As previously described, it is desired to allow only one welding machine to pass current at any given time and to positively lock out other welding machines when one machine is welding. It is also desired to determine an order of operation should several machines want to pass welding current simultaneously. The utilization of the circuitry described in carrying out these functions may best be described in reference to the apparatus as a whole, as described below.

*Operation*

During stand-by condition of the apparatus the power switches (not shown) are closed to energize the various supply transformers. In the sequence sections the discharge devices 55 will therefore conduct to charge the timing capacitors 57. The electronic gate circuit 100 will start to function in the manner hereinbefore described with the discharge devices 130—130" continuously conducting one after the other. With the apparatus thus prepared welding operations may be started.

If it is desired to perform a welding operation with the first welder the start switch 21 is depressed and the welder control therefor is initiated. The normal cycle of events will commence with the energization of discharge device 19 and relay 20. Discharge device 31 will then pass current through a circuit including the relays 96b, 97a, 81c and 82d providing this welder is the only one welding at that time. This causes the energization of transformer 34 which places a positive voltage on the control grid of discharge device 104. Device 104 is now properly conditioned on the control grid side to conduct but the bias present on its screen grid still prevents it from conducting. Device 104 will conduct, however, when the discharge device 130 pertaining thereto fires to energize the transformer 118 and provides a signal for driving the screen grid bias positive.

Upon conduction of discharge device 104 the intermediate relay 80 and the auxiliary relay 83 are immediately actuated to shift their respective relay contacts. Contacts 80a are closed thereby allowing the relay 36 to be actuated and starting the "weld time" for the first welder. The other normally closed contacts 80b and 80d are simultaneously opened to block the completion of the respective plate circuits for the discharge devices 31' and 31". Once the relay 80 has been actuated the discharge devices 31' and 31" cannot fire and must wait in turn for the completion of the "weld time" in the first initiated welder.

Energization of auxiliary relay 83 effectively ties the screen grid and the cathode of discharge device 104 together by the actuation of contacts 83a to insure that this device will conduct as long as discharge device 31 is firing. The other normally open contact 83b closes in the anode-cathode circuit of discharge device 134 and time delay starts with the discharging of capacitor in the RC network 140, to decrease the negative signal on the control grid of this last mentioned discharge device.

In order to accomplish an interlock for the "weld time" only it is necessary to provide some means responsive to flow of welding current to bypass the closed contacts 80b and 80c in the second and third welder control, respectively, since it will be remembered that discharge device 31 will remain conductive much longer than the actual time welding current is flowing. As explained in connection with Figure 1 of the drawing, this device is not extinguished until after the entire welding operation is completed and discharge device 19 is deenergized. Stated differently, either the device 31' or 31" must be able to pass current after the flow of welding current has been completed in the first welder but discharge device 31 must be kept conductive to allow the welding operation to be completed.

This is accomplished by the time delay network and the weld signal relay network. After a certain transfer time has elapsed, the time from the closure of relay 36 until current is actually flowing in the welding transformer 54, voltage will appear across the welding transformer 54 and this causes energization of transformer 144 thereby superimposing a positive signal in the control grid circuit of the discharge device 141 causing the same to fire. Conduction of this discharge device energizes the weld signal relay 95 and the shifts normally closed contacts 95a and 95b in the plate circuits of discharge devices 31' and 31". At this instant of time the plate circuits of these last mentioned discharge devices each contain two open relay contacts which prohibit the conduction of these devices and as a consequence the start of actual welding in any of these welders.

The time consumed in the discharging of the capacitor in the RC network 140 to relieve the negative bias present on the the control grid of discharge device 134 is such that this device passes current shortly after actuation of the weld signal relay 95. Discharge device 134 will therefore conduct and actuate relay 90 and cause the closure of relay contacts 90a and 90b. These contacts are arranged in shunting relation with respect to the contacts 80b and 80d of the intermediate relay 80 in the sequencing section of the second and third welder controls. The actuation of discharge devices 31' and 31" is still prohibited due to the open contacts 95a and 95b of the weld signal relay 95.

After "weld time" has been completed and current has stopped flowing in the welding transformer 54 the negative voltage on the control grid of discharge device 139 will again gain control to stop conduction of this device and allow the weld signal relay 95 to be deenergized thereby closing contacts 95a and 95b in the other two welder controls. It will be appreciated that upon closure of these relay contacts either the second or third welder may be actuated to start another welding operation while the first welder is completing its operation. When the first welder is completely finished discharge device 31 will stop conducting and as a consequence the discharge device 104 is extinguished and all relays return to their normal position. Notice is taken of the fact that the resetting of these various relays will not effect any other welder which may be welding at this time.

Considering now certain conditions which will demonstrate the complete safety of the apparatus disclosed, it is possible that all of the three sequencing sections, 10—10", of the welders will be started at exactly the same time and continue in unison until the discharge devices 31, 31' and 31" conduct simultaneously. However, the electronic gate circuit will allow only one of the discharge devices 104—104" to conduct thereby actuating the intermediate relay and instantaneously dropping out two of the discharge devices 31—31" until the "weld time" is completed in the selected welding machine. Meanwhile, however, the electronic gate circuit will continue to revolve and eventually allow one of the other welders to begin its "weld time" upon completion of the flow of welding current in the first welder.

Conclusion

Although we have shown the commutator of the present invention controlling a battery of three welding machines, the principles may be readily applied to any number of such mechanisms. The various networks in the commutator are essentially repetitious, one identical section being added to each of the various relay controlling networks for each additional welder and providing additional contacts for the relays in these circuits. As a guide for those practicing the present invention, the number of contacts required on any of the relays of the commutator is given in the following table:

Number of welders to be controlled____________ $n$
Contacts on each intermediate relay____________ $n$
Contacts on each auxiliary relay______________ 2
Contacts on each timing relay________________ $n-1$
Contacts on each weld signal relay____________ $n-1$ One important ancillary aspect of the present invention is that the actual sequence section of each individual welder is not materially interrupted by the commutator or interlocking device since all timing functions, with the exception of the "squeeze time," such as the charging or discharging of various capacitors, are not allowed to begin unless the sequencing section has been selected by the commutator. Each welder can wait as long as necessary to pass welding current without the sequence and synchronous sections of the welder misfunctioning.

It should thus be apparent that we have accomplished the objects initially set forth. The commutator provides a definite and positive interlock between a battery of welding machines to insure that only one of the same is passing welding current at any given time. The arrangement is such that the interlocking occurs during "weld time" only whereby maximum possible production can be maintained but yet the size of the supply system is substantially reduced when compared to the system required if each machine operated independently. Further, the commutator is electronic and has no moving parts other than the various relay contacts. It is noted that the relays associated with each individual welder are only actuated when that welder is energized to pass welding current.

The representative embodiment of the invention disclosed and shown herein is meant to be illustrative only as the principles involved are adaptable to many uses, such as, for example, controlling a plurality of other types of machines each requiring intermittant power from a common source. Reference should therefore be had to the following appended claims in determining the scope of our invention.

We claim:

1. An electric system comprising a source of electric power, a plurality of load devices, individual control means associated with each of said plurality of load devices comprising at least an electronic discharge device which must be energized to initiate the flow of electrical energy to the load device associated therewith, commutating means for said plurality of load devices, said commutating means comprising means operative in response to the flow of electrical energy to one of said load devices to block the energization of said discharge devices associated with the other of said load devices, and said commutating means further comprising means operative to block energization of said discharge device associated with said other of said load devices without effecting the energization of the discharge device associated with said one load device after the flow of electrical energy has been stopped to said last mentioned load device.

2. A system comprising a plurality of electrical machines and a common source of electrical supply for said machines, each of said machines having control means, each of said control means comprising in part an electronic discharge device and a relay which must be concurrently energized to start the flow of electrical energy to the machine associated therewith, a plurality of circuit paths joining said discharge device and said relay, a plurality of relay contacts in said paths, commutating means for controlling the shifting of said relay contacts, said contacts initially allowing the energization of said discharge devices, said commutating means operative to shift said relay contacts upon the energization of one of said discharge devices to open the circuit paths for said other discharge devices and complete a circuit causing the actuation of the relay associated with said one of said discharge devices, and said commutating means further comprising means to shift said relay contacts whereby said other discharge devices may be energized without interrupting the conduction of said one discharge device and relay associated therewith upon completion of the flow of current to the machine controlled by said one discharge device and relay.

3. Commutating apparatus for controlling the flow of current from a common source to a plurality of electrical machines each having its own control means whereby only one of said machines is operatively connected to said source at any time comprising a discharge device for each of said machines, a relay for each of said machines adapted to be actuated upon conduction of the discharge device associated therewith, each of said relays having normally open contacts in the control of the machine associated therewith and normally closed contacts in each control of the other machines, said discharge devices being maintained normally non-conductive, means responsive to the energization of said control means for said machine to partially condition said discharge devices for conduction, switch means operative to partially condition said discharge devices for conduction in a consecutive and one-at-a-time manner, said discharge devices being rendered conductive upon concurrent conditioning thereof by said means responsive and said switch means whereby only one of said discharge devices may conduct at any given time, the arrangement being such that when one of said discharge devices conducts said relay contacts are shifted to allow the flow of electrical current to the machine associated therewith and prohibit the energization of the other machines.

4. Apparatus according to claim 3 further characterized in that said switch means comprises a second electrical discharge device associated with each of said machines, each of said second discharge devices having a control grid element, means to impress a control potential on said control grids comprising a source whereby said second discharge devices are normally maintained non-conductive, means to superimpose a second control potential on said control grids of said second discharge devices to cause the same to conduct, and said last mentioned means being adapted to apply said signal individually to said control grids of said second discharge devices in a consecutive order whereby said second discharge devices are caused to conduct one after the other in a continuous manner.

5. Apparatus according to claim 3 further characterized in that said switch means comprises a second electrical discharge device associated with each of said machines, each of said second discharge devices having an anode, a cathode and a control grid element, a source of electrical supply, each of said second discharge devices having the primary of a transformer connected in series with said anode and cathode thereof across said source of supply, means to impress a control potential on said control grids whereby said second discharge devices are normally maintained non-conductive, means for superimposing a second control signal on said grid elements, said last mentioned means comprising for each of the second discharge devices a secondary of the transformer pertaining to another of said second discharge devices, and one of said second discharge devices having auxiliary starting means for superimposing a control signal on the grid element thereof to initiate conduction therein whereby when said starting means is actuated said second discharge devices will begin to conduct in a consecutive order one after the other in a continuous manner.

6. Commutating apparatus for controlling the flow of current to a plurality of electrical machines each having its own control means whereby only one of said machines is operatively coupled to said source at any time comprising a first discharge device for each of said machines, said first discharge devices having grid control elements, means operative upon conduction of one of said first discharge devices to allow the flow of welding current to the machine associated therewith, said discharge devices being maintained normally non-conductive, means responsive to initiation of said control means of said machine to partially condition said first discharge devices for conduction, a second discharge device operatively connected with one control grid of each one of said first discharge devices and adapted upon conduction to partially condition the same for conduction, said second discharge devices having control grid elements, each of said second discharge devices operatively connected with the grid element of another of said second discharge devices, said first discharge devices being rendered conductive upon concurrent conditioning thereof by said means responsive and conduction of said second discharge devices, means for initiating conduction in one of said second discharge devices whereby the same are caused to conduct in consecutive one-at-a-time order, and means operative upon the conduction of one of said first mentioned discharge devices to prohibit conduction in the other machines.

7. Commutating apparatus for controlling the flow of current to a plurality of electrical machines from a common source, each of said machines having its own control means, a discharge device for each of said machines, said discharge devices being maintained normally non-conductive, means responsive to initiation of any of said control means to partially condition for conduction the one of said discharge devices associated therewith, and switching means for alternately partially conditioning said discharge devices for conduction in consecutive one-at-a-time order, the arrangement being that any of said discharge devices will conduct upon simultaneous conditioning thereof by said means responsive and said switching means.

8. Apparatus according to claim 7 further comprising means actuated upon energization of one of said first discharge devices to block the energization of the other of said first discharge devices.

9. Apparatus according to claim 7 further comprising means initiated upon conduction of any one of said discharge devices to isolate the same from said switching means whereby said last mentioned discharge device will conduct upon conditioning from said means responsive.

10. Apparatus according to claim 8 further comprising means to relieve said means actuated operative to block without effecting energization of the initiated control means.

11. Apparatus according to claim 10 further characterized in that said means to relieve further comprises means responsive to the flow of electrical energy to said machines.

12. Commutating apparatus for controlling the flow of current to a plurality of electrical machines from a common source comprising a discharge device for each of said machines, each of said discharge devices having an anode, a cathode and a control grid element, a control circuit for impressing negative hold-off bias on the control grid elements of said discharge devices thereby maintaining the same normally non-conductive, and means responsive upon the conduction of any one of said discharge devices to impress a second control bias on another of said discharge devices thereby causing the same to fire after said one of said discharge devices has been extinguished.

13. Apparatus according to claim 12 further comprising means to initiate conduction in one of said discharge devices, said means to initiate comprising an auxiliary discharge device having an anode, cathode and control grid element, a control circuit for impressing a hold-off signal on said grid control element whereby said auxiliary discharge device is normally maintained non-conductive, a capacitor, a relay, a charging circuit for said capacitor including normally closed contacts of said relay, a discharging circuit for said capacitor including normally open contacts of said relay and the control grid element of said last mentioned discharge device, and means responsive to conduction in said auxiliary discharge device to superimpose a control signal on the control grid of one of said discharge devices whereby the same will conduct.

14. Commutating apparatus for controlling the flow of current to a plurality of electrical machines from a common source, each of said machines having its own control means, an intermediate relay for each of said machines having normally open contacts in the control means of the machine associated therewith and normally closed contacts in the other control means, a second relay for each of said machines having normally open contacts arranged in shunting relation with the normally closed contacts of said intermediate relays, a signal relay associated with each of said machines and having normally closed contacts in the control means of the other machines, and means to actuate said relays whereby only one of said machines is connected to said common source at any time.

15. Apparatus according to claim 14 further characterized in that said means to actuate comprises means responsive to the energization of any one of said control means to energize the intermediate relay associated therewith thereby shifting the contacts thereof and allowing one machine to conduct and blocking energization of the other control means.

16. Apparatus according to claim 14 further characterized in that said means to actuate comprises means responsive to the flow of current in any one of said machines to energize said signal relay associated therewith to shift said normally closed contacts thereof and block the energization of the other control means.

17. Apparatus according to claim 15 further characterized in that said means to actuate further comprises means operative a predetermined time after actuation of any one of said intermediate relays to energize one of said second relays whereby the normally closed contacts of said last mentioned intermediate relay are shunted by closure of the contacts of said second relay.

18. Commutating apparatus for controlling the flow of current to a plurality of electrical machines from a common source, each of said machines having its own control means, an intermediate relay for each of said machines having normally open contacts in one of said control means and normally closed contacts in the control means of the other machines, a signal relay associated with each of said machines and having normally closed contacts in the control means of the other machines, means to shunt said normally open contacts of said intermediate relays, and means to actuate said relays whereby only one of said machines is connected to said source at any given time.

No references cited.